Dec. 14, 1954          H. L. MISCH          2,696,660
METHOD OF MAKING IMPELLER BLADES
Filed Sept. 30, 1948          4 Sheets-Sheet 1
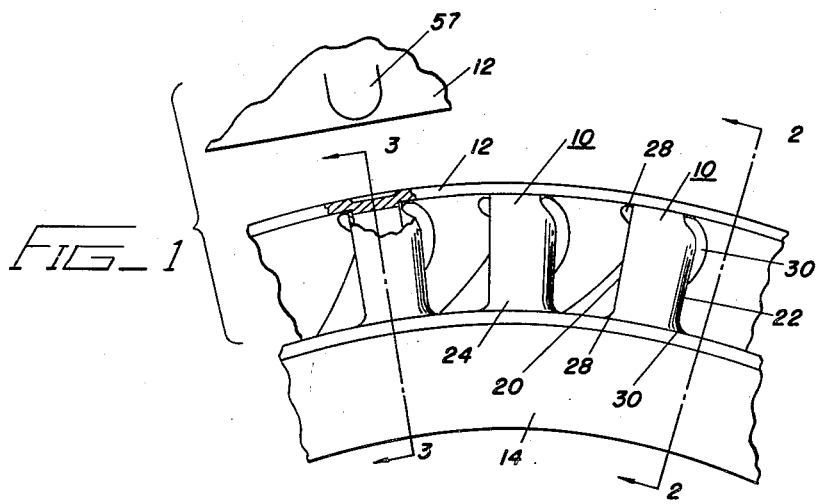
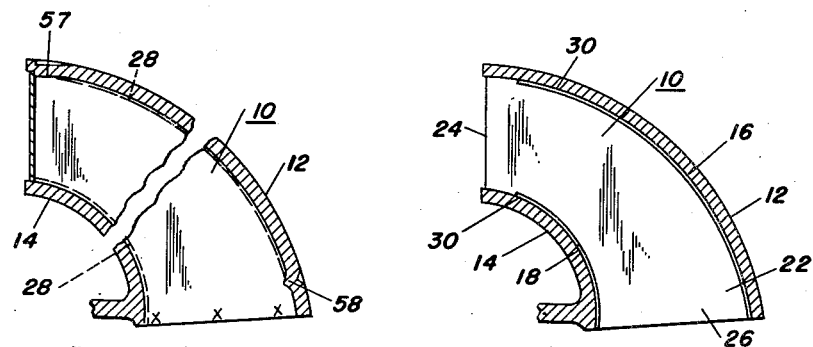
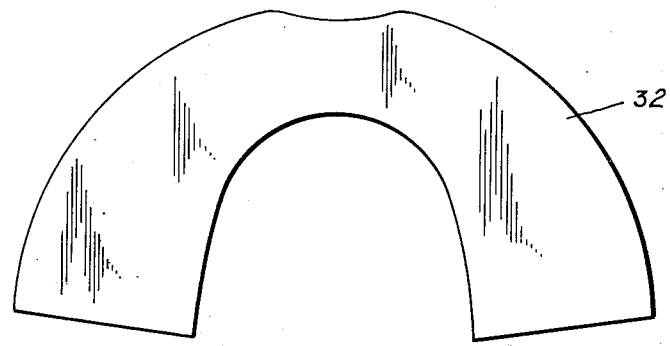
INVENTOR.
HERBERT L. MISCH
BY
ATTORNEY Dec. 14, 1954    H. L. MISCH    2,696,660
METHOD OF MAKING IMPELLER BLADES
Filed Sept. 30, 1948    4 Sheets-Sheet 2
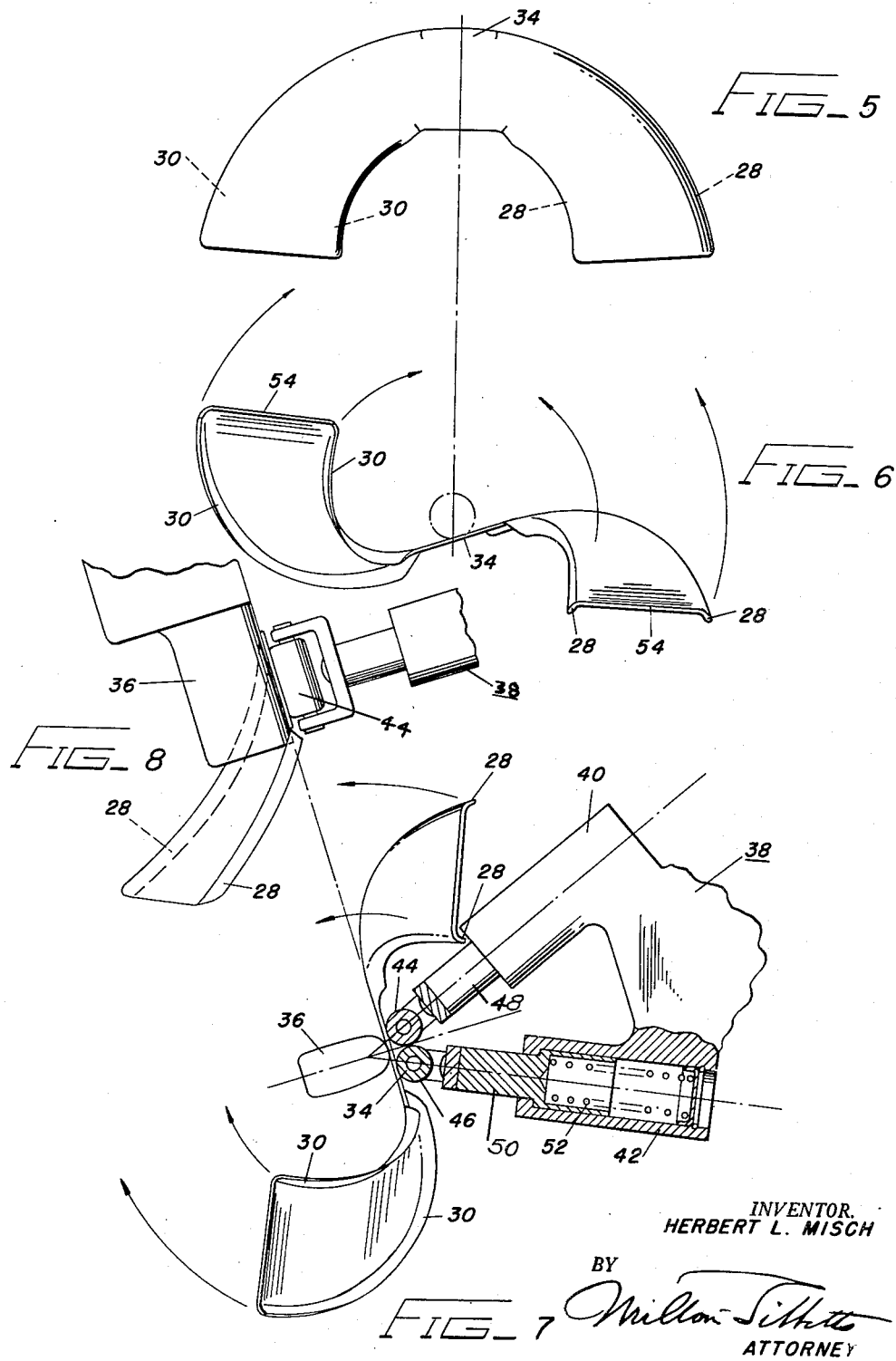
INVENTOR.
HERBERT L. MISCH
BY
ATTORNEY Dec. 14, 1954  H. L. MISCH  2,696,660
METHOD OF MAKING IMPELLER BLADES
Filed Sept. 30, 1948  4 Sheets-Sheet 3
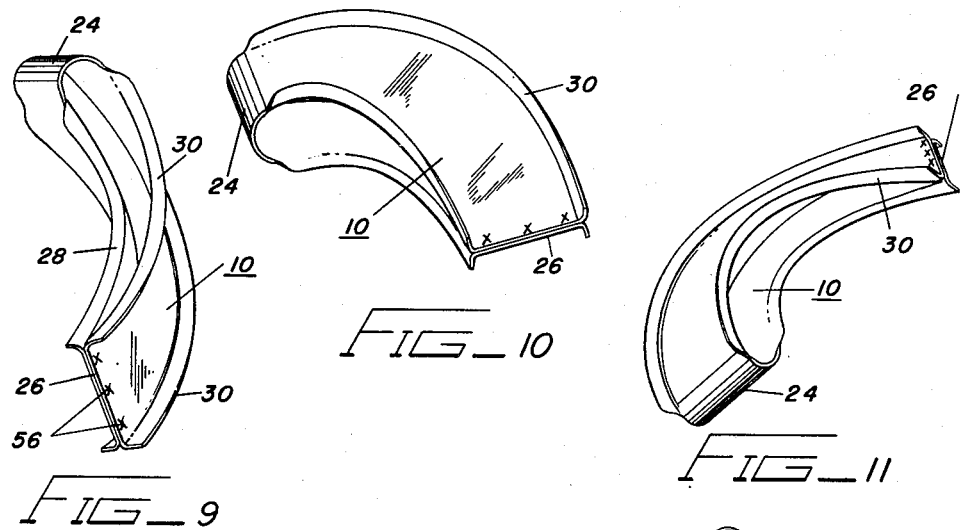
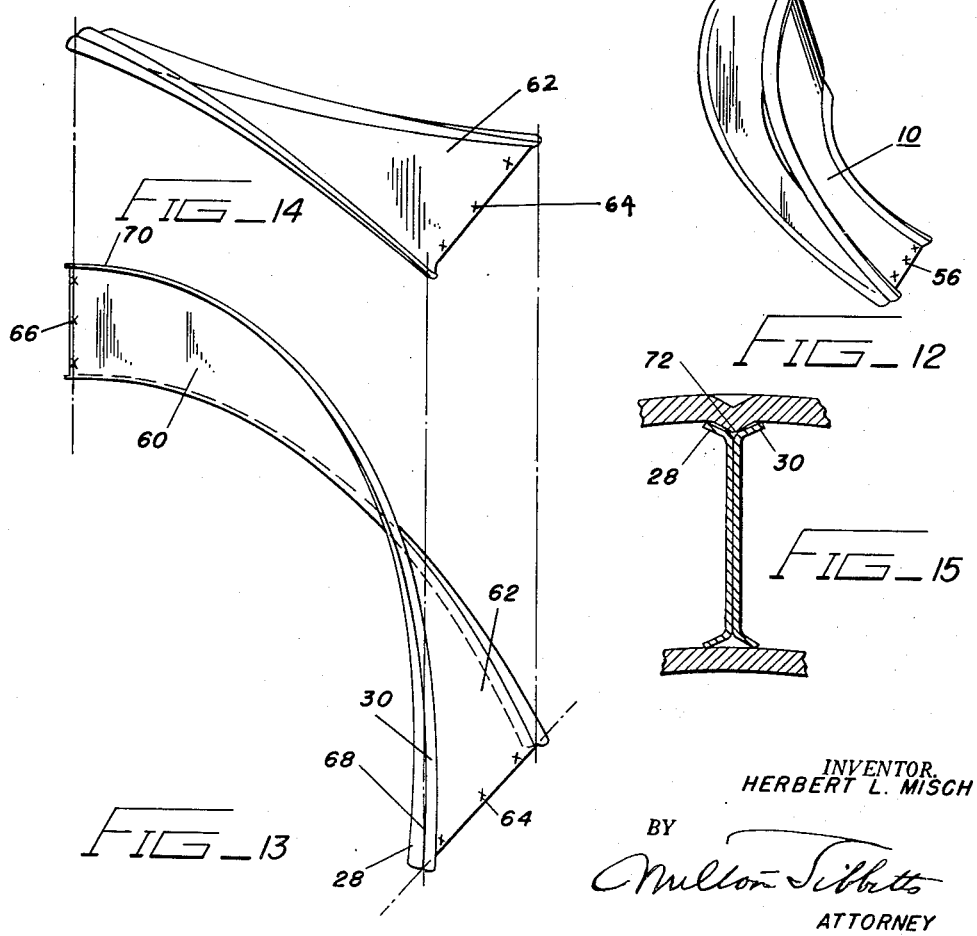
INVENTOR.
HERBERT L. MISCH
BY
*Milton Tibbetts*
ATTORNEY Dec. 14, 1954 H. L. MISCH 2,696,660
METHOD OF MAKING IMPELLER BLADES
Filed Sept. 30, 1948 4 Sheets-Sheet 4
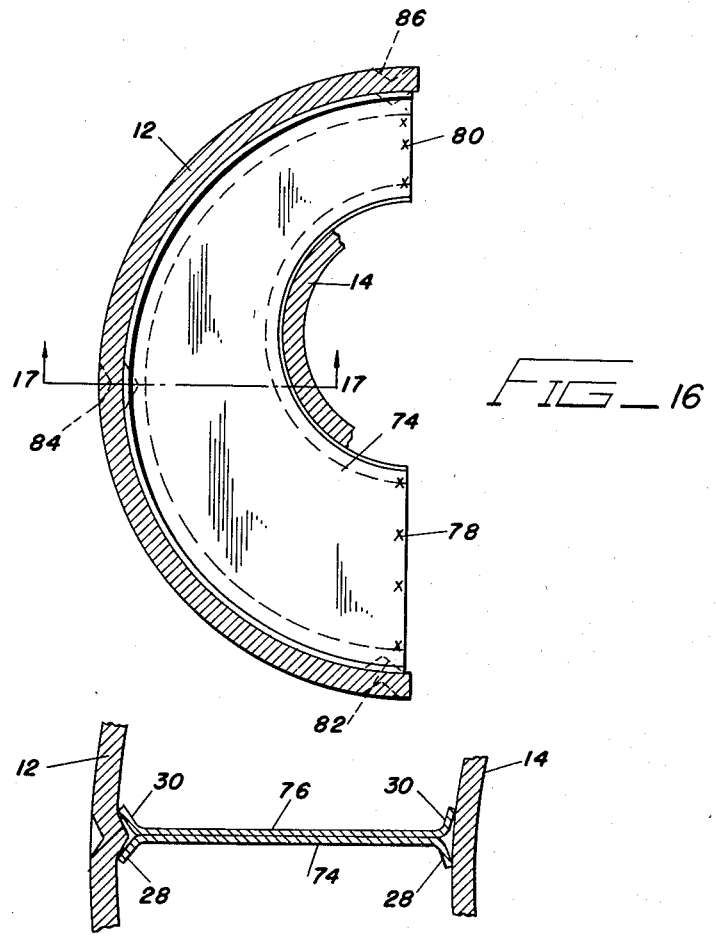
FIG_16
FIG_17
INVENTOR.
HERBERT L. MISCH
BY
ATTORNEY United States Patent Office 2,696,660
Patented Dec. 14, 1954

2,696,660

METHOD OF MAKING IMPELLER BLADES

Herbert L. Misch, Toledo, Ohio, assignor to Packard Motor Car Company, Detroit, Mich., a corporation of Michigan Application September 30, 1948, Serial No. 52,078

1 Claim. (Cl. 29—156.8)

This invention relates to fluid operated transmissions, and more particularly to an improved device having stamped vanes secured to spaced outer shell and inner shroud members in an improved manner, and to the method of forming the vanes and securing them in place.

Fluid operated devices for transmitting torque from an engine or prime mover to a driven member such for example as the driving wheels of a vehicle are of two principal types, the fluid coupling and the torque converter. The fluid coupling generally has driving and driven members adapted to function as a clutch to transmit power with no multiplication of torque. The torque converter has a reaction member adapted to deflect the circulating fluid in such a manner that multiplied torque may be exerted on the driven member. The torque converter thus has at least three members, and certain of these members may have more than a single stage.

The fluid coupling may have vanes of uniform thickness, but it is desirable that certain of the vanes of the torque converter be of varying contour to transmit multiplied torque at high efficiency.

Many attempts have been made to develop an economical and accurate method of forming the rotatable members of fluid couplings and torque converters. These attempts have not proved to be satisfactory because the vanes must be spaced with a relatively high degree of accuracy, and they must be secured in place in such a manner that minimum turbulence of the circulating fluid is encountered.

An object of this invention is therefore to provide a rotatable member for a fluid transmission wherein stamped fluid deflecting members are provided with oppositely disposed reinforcing flanges adapted to be secured to spaced outer shell and inner shroud members in an improved manner.

A further object of the invention is to provide an improved fluid deflecting member having stamped vanes provided with oppositely extending flanges adapted to engage locating means formed in spaced outer shell and inner shroud members to accurately position the vanes.

Yet another object of the invention resides in the provision of an improved method of securing fluid deflecting vanes in place in a rotatable member in such a manner that it is unnecessary to maintain the parts within close manufacturing tolerances.

Another object of the invention is to provide a fluid deflecting member having stamped vanes provided with angularly related flanges adapted to be crushed down into intimate contact with spaced outer shell and inner shroud members, and secured thereto by a fusing operation.

Still a further object of this invention is to provide a fluid deflecting member formed of double walled vanes having angularly related flanges fused to outer shell and inner shroud members in such a manner that minimum resistance to fluid flow is encountered, and the vanes are accurately positioned by locating means carried by the shell or shroud members and projecting between the angularly related flanges of the double walled vanes.

A further object of the invention is to provide double walled fluid deflecting vanes that can be economically formed by a stamping operation and having angularly related rigidifying flanges adapted to be secured to spaced outer shell and inner shroud members.

Another object is to provide contoured double walled fluid deflecting vanes that can economically be formed by a progressive stamping operation, the vanes embodying any desired contour and having angularly related rigidifying flanges.

Still another object of the invention resides in the provision of an improved method of forming a contoured article by a stamping operation wherein angularly related rigidifying flanges are formed on the contoured article to render it sufficiently stiff that objectionable springback will not be encountered due to the use of materials varying somewhat in physical characteristics in the formation of articles where a predetermined shape must be maintained over a substantial portion of the article.

Other objects and advantages of this invention will appear in the following description and appended claims, reference being had to the accompanying drawings forming a part of this specification, and wherein similar reference characters refer to similar parts throughout the several views.

Fig. 1 is a fragmentary front elevational view, partly in section, of a rotatable fluid deflecting member embodying my invention.

Fig. 2 is a sectional view taken substantially on the line 2—2 of Fig. 1 looking in the direction of the arrows.

Fig. 3 is a sectional view taken substantially on the line 3—3 of Fig. 1 looking in the direction of the arrows, and showing the means for locating the fluid deflecting vanes in the outer shell and inner shroud members.

Fig. 4 is a plan view of a blank for a torque converter vane.

Fig. 5 is a plan view of the vane blank illustrated in Fig. 4 after certain additional stamping operations have been performed thereon.

Fig. 6 is an end elevational view the vane illustrated in Fig. 5.

Fig. 7 is a schematic view illustrating the operation of wrapping the stamped vane blank about a form to provide a vane having contoured walls.

Fig. 8 is a view similar to Fig. 7 but taken at right angles thereto.

Figs. 9 to 12 are perspective views illustrating the vane wrapped into final form with the ends secured together.

Figs. 13 and 14 are side and bottom elevational views of a modified form of the invention applied to the making of contoured vanes of uniform thickness.

Fig. 15 is a sectional view illustrating the means for locating the vanes in the outer shell and in the inner shroud.

Fig. 16 is a side elevational view illustrating the inventions as applied to the formation of a flat vane of uniform thickness.

Fig. 17 is a sectional view taken substantially on the line 17—17 of Fig. 16.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Figs. 1 to 3 the invention is illustrated as applied to the formation of one of the rotatable members of a torque converter. It will be noted that a plurality of spaced vanes 10 are interposed between and are secured to an outer shell 12 and to an inner shroud 14. The outer shell 12 is of annular shape and has a concave inner surface 16 as illustrated in Fig. 2. The inner shroud 14 is also of annular shape and has a convex outer surface 18 as also illustrated in Fig. 2.

The vanes 10 are formed of two thicknesses of stamped material having front and back surfaces 20 and 22, and have leading and trailing edges 24 and 26 respectively. The front and back surfaces 20 and 22 of the vanes 10 have angularly related flanges 28 and 30 extending in opposite directions to engage, and be secured to the concave inner surface 16 of the outer shell 12 and to the convex outer surface 18 of the inner shroud 14 respectively.

It will of course be apparent that the vanes 10 may embody any desired shape from flat vanes of uniform thickness to contoured vanes having rounded sections of fluid foil or other shapes, the walls defining the front and back surfaces 20 and 22 being spaced apart and approximately shaped to provide the desired contours. Also it will be apparent that the concave inner surface 16 of the outer shell 12 and the convex outer surface 18 of the inner shroud 14 may be disposed at any desired angles relative to each other, and they may be of any suitable circumferential length and radial curvature. My invention is thus particularly well adapted to the formation of the vaned rotatable members of fluid couplings which may have two rotatable members embodying substantially flat vanes of uniform thickness, or to the formation of the vaned rotatable members of torque converters having three or more rotatable members embodying vanes of any desired contours, and wherein one or more of the rotatable members may embody two or more stages.

Figs. 4 to 8 disclose certain of the steps embodied in the making of a vane of the type illustrated in Figs. 9 to 12. As illustrated in Fig. 4, a blank 32 of appropriate shape and dimensions to form the vane illustrated in Figs. 9 to 12 is stamped from a sheet of metal. The blank 32 is then subjected to certain stamping operations to form the angularly related flanges 28 and 30, and to shape the central and trailing edge portions to conform with the desired curvature of the vane as illustrated in Figs. 9 to 12. These operations may be performed by a single stamping operation, or any desired number of stamping operations may be employed to impart the desired shape to the vane blank.

After the vane blank 32 has been shaped as illustrated in Figs. 5 and 6 the central portion 34 may be bent around a form 36 embodying the desired curvature of the leading edge 24 of the vane 10. It will be noted that the central portion 34 is flat, the angularly related attaching flanges 28 and 30 being interrupted at this point to facilitate wrapping the contoured vane blank about the form 36.

Any suitable mechanism may be employed to wrap the contoured vane blank around the form 36. For purposes of illustration I have shown a fixture 38 having spaced arms 40 and 42 provided with rollers 44 and 46 adapted to contact the central portion 34 of the contoured vane blank and wrap it around the form 36. The rollers 44 and 46 are preferably carried by plungers 48 and 50 slidably mounted in cylinders formed in the arms 40 and 42, springs 52 being provided between the plungers and the arms of the fixture to exert a yielding force on the contoured vane blank urging them around the form 36.

The vane blank illustrated in Figs. 5 and 6 is so contoured that when the central portion 34 is wrapped about the form 36, the opposite ends 54 of the blank are brought together to form the trailing edge 26 of the vane 10. The free ends of the vane are then secured together in any convenient manner as by spot welding illustrated at 56, and the completed vane is removed from the form 36. It will of course be apparent that the free ends of the vane may be secured together after the vane has been removed from the form 36.

To assemble the vanes 10 with the outer shell 12 and the inner shroud 14, the outer shell is preferably positioned horizontally and the vanes 10 are placed therein. The shell 12 may have spaced locators 57 and 58 of suitable contour to locate the vanes in predetermined spaced and angular relation therein. The locators 57 may be formed by a punching operation, and may be of rounded configuration as illustrated in Fig. 1 to receive the rounded leading edge 24 of the vanes. The locators 58 may also be formed by a punching operation to provide a projection to fit between the converging walls of the vane adjacent the trailing edge 26. The inner shroud 14 is then positioned in place on the upstanding edges of the vanes 10, and the assembly thus formed subjected to any suitable brazing or welding operation to lock the assembly together.

It will be noted that the angularly related flanges 28 and 30 of the vanes 10 are formed as somewhat less than right angles. After the vanes have been assembled in the outer shell and inner shroud, pressure may be exerted urging the shell and shroud toward each other, thereby bending over any of the flanges that are somewhat high and insuring the development of good contact between any of the flanges that are somewhat lower than desired with the outer shell and the inner shroud. Slight irregularities in the formation of the parts may thus be compensated for in an efficient and economical manner.

I have found that very satisfactory results are achieved when the vanes are secured in the outer shell and to inner shroud by copper brazing. Copper may be deposited on the vanes 10 in any convenient manner as by a barrel plating operation. The vanes may then be assembled in the outer shell and inner shroud, pressure being applied to insure intimate contact between the flanges 28 and 30 of the vanes and the shell and shroud. The assembly thus formed may be passed through an oven preferably in the presence of an inert gas. The vanes are thus securely bonded to the shell and shroud.

Any other suitable method of applying copper to the contacting surfaces of the flanges 28 and 30 of the vanes 10 may of course be employed, or the vanes can be formed of metal having a copper surface bonded thereto. It will also be apparent that the desired copper to support the brazing operation can be applied to the concave inner surface 16 of the outer shell 12 and to the convex outer surface 18 of the inner shroud 14.

Attention is directed to the fact that as the outer shell and the inner shroud are pressed into intimate contact with the vanes 10, the flanges 28 and 30 are deformed or bent outwardly to provide substantial surface contact of the flanges 28 and 30 with the outer shell and with the inner shroud. When the assembly is brazed or welded the copper or other fluxing agent employed wets the contacting surfaces and flows by capillary attraction to fill in a portion of the diverging surfaces of the flanges with the shell and shroud members to provide a solid contact or bond to more securely fasten the assembly together than would be possible if the parts were secured by edge contact alone.

The flanges 28 and 30 form continuous fillets at the juncture between the vanes with the outer shell and inner shroud to minimize energy losses as the fluid flows through the rotatable members. The fluid is guided smoothly by the fillets thus formed and no projections or other irregularities extend into the fluid path that could cause turbulence of the fluid accompanied by energy losses.

Figs. 13 to 15 illustrate the invention as applied to the making of a rotatable member having contoured fluid deflecting vanes of uniform thickness. Vane segments 60 and 62 of appropriate sizes shaped to embody the desired curvatures have the angularly related flanges 28 and 30 formed thereon. These vane segments are secured together at opposite ends as by a welding operation illustrated at 64 and 66, or in any other convenient manner. Locating means in the form of punched or otherwise formed projections 72 formed at spaced points in the outer shell 12 are provided to extend into the groove formed between the flanges 28 and 30 of the vanes as for example at the points 68 and 70 to accurately locate the vanes circumferentially in the shell and shroud members. The groove formed between the flanges 28 and 30 provides natural automatically formed means for locating the vanes. The vanes may be located radially between the outer shell 12 and the inner shroud 14 by being urged into contact with the converging concave surface 16 of the outer shell 12 and the convex surface 18 of the inner shroud 14, the brazing or welding fixture having a member to contact a portion of the end of each vane to hold them in predetermined positions. These vanes are assembled in the outer shell 12 in the same manner as the vanes illustrated in Figs. 1 to 12. The inner shroud 14 is then positioned in place and the elements secured together as discussed above.

Figs. 16 and 17 illustrate the application of the invention to the making of the rotatable members of a fluid coupling, preferably having flat vanes of uniform thickness. As illustrated, flat vane segments 74 and 76 having angularly related flanges 28 and 30 are secured together as at 78 and 80 and are positioned in the outer shell 12 on three locators 82, 84 and 86 as discussed in connection with the embodiment of the invention illustrated in Figs. 13 to 15. The parts are assembled and secured together in the manner described above in connection with the other embodiments of the invention.

It will be understood that various forms of the invention other than that described above may be used without departing from the spirit or scope of the invention.

I claim:

The method of forming from sheet metal a hollow arcuate longitudinally tapering mechanically rigid blade which comprises, stamping from a metal sheet a flat generally semi-annular blank which is substantially symmetrical about an axis in the plane of the blank and which passes through about the mid-point thereof, longitudinally reversely curving the elongated arcuate end portions of the blank while maintaining a relatively short midportion thereof substantially flat, deflecting toward one side of the blank both of the longitudinal arcuate margins of both of the reversely curved end portions thereof to form arcuate stiffening flanges, each flange extending from the terminal end of the arcuate end portion of which it forms a part substantially to the flat midportion of the blank, bringing the terminal ends of said arcuate end portions of the blank into mutual engagement by bending the midportion about an axis offset therefrom and parallel to the axis of symmetry of the blank, the bending operation bringing the stiffening flanges of the respective arcuate reversely curved end portions of the blank into oppositely facing relationship, and fixedly uniting the terminal ends of said arcuate end portions.

References Cited in the file of this patent

UNITED STATES PATENTS

| Number | Name | Date |
|---|---|---|
| 1,246,090 | Hagen | Nov. 13, 1917 |
| 1,331,140 | Berhold | Feb. 17, 1920 |
| 2,115,895 | Weihmann | May 3, 1938 |
| 2,256,988 | Michailoff | Sept. 23, 1941 |
| 2,293,768 | Schaefer | Aug. 25, 1942 |
| 2,337,619 | Miller | Dec. 28, 1943 |
| 2,347,034 | Doran | Apr. 18, 1944 |
| 2,387,722 | Dodge | Oct. 30, 1945 |
| 2,494,539 | Bolender | Jan. 17, 1950 |